(12) United States Patent
Johnson et al.

(10) Patent No.: US 10,437,797 B1
(45) Date of Patent: Oct. 8, 2019

(54) IN-MEMORY DISTRIBUTED DATABASE WITH A REMOTE DATA STORE

(71) Applicant: A9.com, Inc., Palo Alto, CA (US)

(72) Inventors: Anoop Kochummen Johnson, Santa Clara, CA (US); Ryan McKenzie White, Mountain View, CA (US); Nanheng Wu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 680 days.

(21) Appl. No.: 14/569,264

(22) Filed: Dec. 12, 2014

(51) Int. Cl.
*G06F 17/30* (2006.01)
*G06F 7/00* (2006.01)
*G06F 16/21* (2019.01)
*G06F 16/2458* (2019.01)

(52) U.S. Cl.
CPC ........ *G06F 16/214* (2019.01); *G06F 16/2471* (2019.01)

(58) Field of Classification Search
USPC ......................................................... 707/770
See application file for complete search history.

(56) References Cited

U.S. PATENT DOCUMENTS

| | | | | |
|---|---|---|---|---|
| 8,671,091 B2* | 3/2014 | Cherniack | ......... | G06F 17/30457 707/606 |
| 9,183,317 B1* | 11/2015 | Cappiello | ......... | G06F 17/30896 |
| 2010/0191730 A1* | 7/2010 | Mishra | .............. | G06F 17/30424 707/736 |
| 2012/0054225 A1* | 3/2012 | Marwah | ............ | G06F 17/30477 707/769 |
| 2016/0055192 A1* | 2/2016 | Bensberg | .......... | G06F 17/30339 707/755 |

OTHER PUBLICATIONS

Oracle® Database Data Warehousing Guide 11g Release 2 (11.2) E25554-02 Jul. 2013 Oracle®.*
Oracle® Database Data Warehousing Guide 11g Release 2 (11.2) E25554-02 Jul. 2013 (Year: 2013).*
"Numerate/Hiring"; GitHub, Inc.; https://github.com/Numerate/hiring; 2015; accessed Mar. 10, 2015; 2 pages.
Chacon; "The Git Object Model"; GitHub; http://schacon.github.io/gitbook/1_git_object_model.html; accessed Mar. 10, 2015; 4 pages.

* cited by examiner

*Primary Examiner* — Kuen S Lu
(74) *Attorney, Agent, or Firm* — Davis Wright Tremaine LLP

(57) ABSTRACT

A distributed in-memory query processor may utilize a remote data store. Column segments may be retrieved from the remote data store and loaded into system memory of a computing node. The query processor may, in response to receiving a request to perform a query, identify columns and ranges of column values required to process the query. Partition-level schemas and cross-partition schemas may be formed for computing nodes holding column segments in memory. Computing nodes may be selected for processing the query based on a degree to which a partition or set of partitions matches data requirements of the query.

20 Claims, 6 Drawing Sheets

IN-MEMORY DISTRIBUTED DATABASE WITH A REMOTE DATA STORE

BACKGROUND

A distributed database system may comprise a number of computing devices, each of which may host a portion of a large dataset. Techniques such as replication and partitioning may be employed to provide scalability regarding the amount of data that may be stored and the ability of the system to respond to queries in a timely fashion. The division of data between the computing devices may, however, cause certain types of queries to be processed inefficiently.

Typically, each computing device maintains a portion of a table on a long-term storage device, such as a mechanical or solid-state drive. The range of data stored on each storage device is typically fixed, due to the amounts of data usually involved and the time and complexity involved in transferring data from one partition to another. However, in many distributed database systems it may be necessary to transfer data between partitions in order to utilize additional storage.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Aspects of the present disclosure may be employed in various embodiments that utilize a distributed, in-memory query processor communicatively coupled to a remote data store. The remote data store may, for example, comprise a scalable storage system hosted by an external operator and accessible over the Internet. The in-memory query processor may comprise a computing node elected as a master and a number of additional computing nodes assigned to act as partitions. The associations between the partitions and ranges of data may be flexibly and dynamically arranged in order to improve query efficiency, improve adaptation to current workload, and to improve utilization of the remote data store.

Data may be maintained on a remote data store in column-oriented format. Embodiments may maintain a store of metadata indicating column segments available for download. The metadata may include information such as the minimum and maximum values, i.e., the range, of data stored in a particular segment. Embodiments may, in response to receiving a query, identify columns implicated in the processing of the query. The range of values needed to process the query may also be identified. Based on the preceding information, embodiments may determine to download applicable column segments from the remote data store to a local computing node acting as a partition. The local computing node may be selected based on column segments already assigned to it. In many cases, all of the data downloaded to a particular computing node may be associated with the same range of rows, so that the computing node may be thought of as a table, or a portion of a table, with a schema comprising those columns that have already downloaded. Embodiments may select a partition or set of partitions for processing the query based on the selections having a current schema matches a schema required to process the query, or on the selections having a current schema that is close to the required schema. In this context, the term "close" may mean having fewer missing column segments as compared to other schemas.

Figure 1:
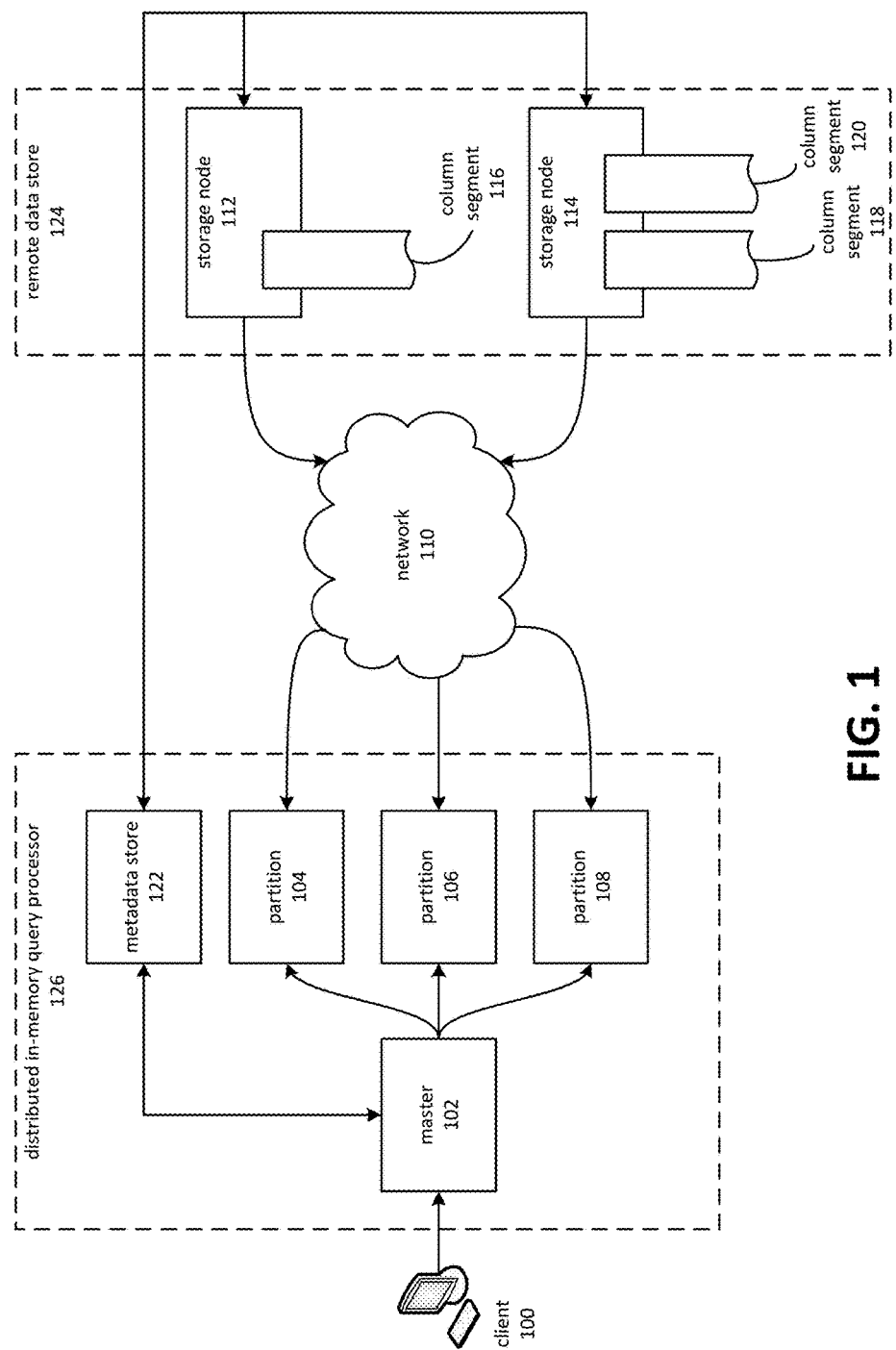
FIG. 1 is a block diagram depicting an example of a database management system that utilizes a scalable remote data store.

FIG. 1 is a block diagram depicting an example of a database management system that utilizes a scalable remote data store. A remote data store 124 may comprise a plurality of storage nodes 112-114. A remote data store 124 may include, for example, a file-oriented data store that is optimized for the storage and/or retrieval of large files. A file may include binary files, text files, object representations, document representations, and so forth.

The configuration of remote data store 124 depicted in FIG. 1 is intended to be illustrative, and should not be viewed as limiting the scope of the present disclosure. A remote data store 124 may comprise various systems configured to provide file-based retrieval mechanisms or large-object retrieval mechanisms. A remote data store may, for example, provide for index-based, identifier-based, or file-name-based storage and retrieval of files, documents, objects, etc.

Embodiments may store data corresponding to a table in the remote data store 124 in a column-oriented format. For example, a first column of a table maintained at remote data store 124 may comprise a first column segment 116 stored on storage node 112, and a second column segment 118 stored on storage node 114. An additional column segment 120, which may not necessarily correspond to the same table as column segments 116 and 118, may be stored on storage node 114. As noted, the configuration is intended to illustrate general aspects of the operation of remote data store 124 and should not be construed as limiting the scope of the present disclosure. Embodiments may utilize remote data store 124 in a manner that is agnostic regarding the placement of column segments, such as column segments 116, 118, and 120, on any particular storage mechanism.

A column-oriented format for a column segment, such as column segments 116, 118, and 120, may include storing at least a portion of the data for a single column within a file, in a manner that allows for an efficient scan of column values. Typically, a column-oriented format may arrange data on a storage device so that retrieval of values for a single column is efficient as compared to other operations, such as retrieval values for additional columns that may, in some cases and embodiments, be stored within the same file.

In some cases and embodiments, a given file may contain data pertaining to a single column.

A client 100 may issue a query (not shown) that involves data stored in remote data store 124. The query may be transmitted to a distributed in-memory query processor 126. In some embodiments, a master 102 may receive the query for processing. The query may be received from client 100 or through one or more intermediaries (not shown). A master 102 may comprise a computing node elected to serve as a coordinator for queries issued to distributed in-memory query processor 126. Additional computing nodes may serve as partitions 104, 106, and 108, and as a metadata store 122. In some embodiments, a metadata store 122 may be maintained by master 102. The embodiment depicted in FIG. 1 shows metadata store 122 as a distinct component of distributed in-memory query processor 126. However, in some cases and embodiments, metadata store 122 may be a remote storage system, such as a distributed key-value database (not shown). In other cases and embodiments, operations of a metadata store 122 may be performed by multiple components. For example, master 102 may maintain a portion of metadata store 122 and an external key-value database might maintain another portion. Each of partitions 104, 106, and 108 might, in some cases, also maintain a portion of metadata store 122.

As noted, various embodiments may maintain metadata store 122 in a remote storage system. A remote storage system may, for example, comprise a distributed key-value store. This configuration may allow election of a new master—for example following failure of the computing node previously elected as master—without loss of metadata. The metadata may describe column segments downloaded to the computing nodes, partition schemas, and cross-partition schemas. A result of this configuration may be that selection of a new master may be done while avoiding reloading or reconstructing this information, or losing the information, in the event that a computing node elected as master should fail.

A metadata store 122 may comprise information indicative of the arrangement and identities of column segments, such as column segments 116, 118, and 120, maintained at remote data store 124. The metadata store 122 may also comprise information indicative of column segments downloaded to partitions 104, 106, and 108. Information pertaining to column segments may include information about the ranges of values represented by each column segment. This may, for example, comprise min-max information, set membership information, hashes of contained values, and so on.

Execution of a query transmitted by client 100 and received by distributed in-memory query processor 126 may be coordinated by master 102. Embodiments may identify columns associated with resolving the query, such as those included in column projections, specified in filter clauses, and so forth. Master 102 may determine, based on metadata store 122, which column segments are to be scanned in order to complete processing of the query. A column segment, such as column segments 116, 118, and 120, may include a subset of a vertically partitioned column.

A partition, such as partition 104, might be associated with a column segment, such as column segment 116. In various embodiments, the association may be temporal in nature. In other words, partition 104 might at one point in time be associated with column segment 116, and at another time with column segment 118 or column segment 120. Partition 104 may be viewed as a table whose schema is dynamically updated based on the column segments associated with it.

It may be the case that a column segment has already downloaded to a partition. For example, it might be the case that, when a query is issued by client 100, partition 106 already has loaded into its memory at least one of the column segments to be used in processing the query. It might also be the case that an additional column to be used in processing the query is not yet loaded into the memory of any of partitions 104, 106, and 108. The column segment may be downloaded over network 110 and loaded into a memory of at least one of these partitions.

Embodiments may load column segments into a partition based on row-alignment. Row-alignment involves the alignment of two column segments regarding the rows represented by each of the two segments. For example, if a first column segment represents column "A" and contains the values of column "A" for rows 1-20 of a table, a second column segment is column-aligned if it represents the values for some other column "B" at rows 1-20. A second column segment would not be row-aligned with the first column segment if, for example, it represented the value of column "B" rows at 21-40, 11-30, and so on.

Embodiments may update metadata to reflect a schema of a table, or more generally a database, that comprises the columns downloaded to a partition. For example, if partition 106 has loaded in its memories column segments pertaining to columns "A" and "B," it may be associated with metadata indicative of a schema of a table comprising columns "A" and "B." The information may also include range information, set membership information, and so forth for the columns included in the schema. Note that the schema for a given partition may vary over time and other partitions may have different schemas.

Embodiments may perform a query by performing one or more of the following operations, not necessarily in the order indicated. In one operation, a distributed in-memory query processor 126 may identify partitions that match the query, based on one or more of the filters associated with the query, the information contained in metadata store 122, the current schema of each partition, the range information associated with column segments, and so on. In another operation, the distributed in-memory query processor 126 may compute a table schema for each partition. In another operation, the distributed in-memory query processor 126 may rewrite the query prior to completing evaluation. The rewrite may include removing filters that have already been fully evaluated by identifying the appropriate set of column segments. The rewrite may also include decomposing aggregations. In another operation, the distributed in-memory query processor 126 may proceed with evaluation of the query by invoking query evaluation procedures on the data contained in each partition. The distributed in-memory query processor 126 may then cause the results of the evaluation to be assembled and transmitted back to client 100.

In various cases and embodiments, partitions 104, 106, and 108 may be selected based at least in part on an amount of capacity needed to process queries. In other words, the number of computing nodes, and the computing capacity of the nodes, may be based on memory and processing capabilities needed to process queries. The capacity may be selected independently of the storage capacity requirements of remote data store 124. Scaling the number of computing nodes may therefore be based on the computing capacity to be used for performing queries, as opposed to the amount of capacity needed to store the raw data used by the system. For example, the actual subset of data used in performing a query might be small when compared to the amount of data maintained in a data warehouse. Some approaches to in-memory databases might require increased capacity of the computing nodes based on the amount of data maintained in the system, as opposed to the amount of data or computing power used in processing queries.

Figure 2:
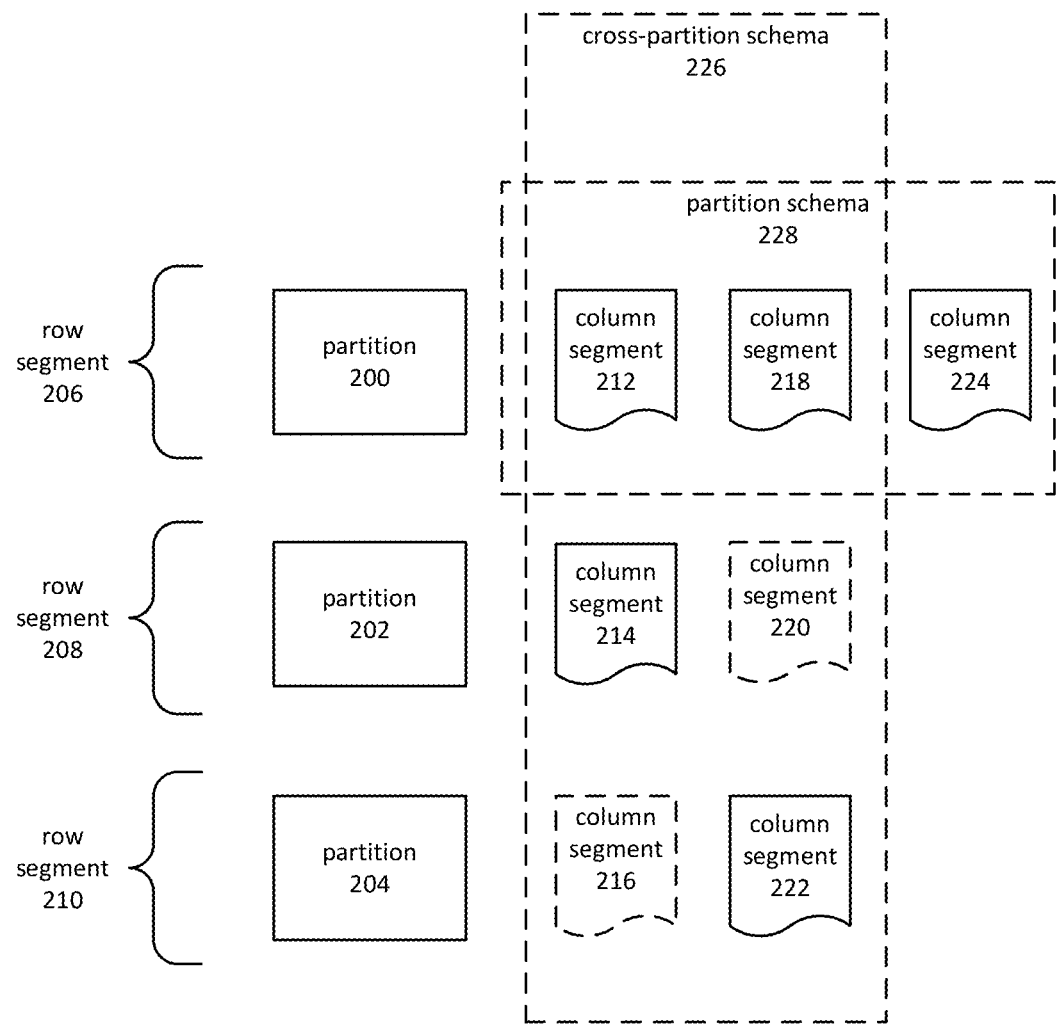
FIG. 2 is a block diagram depicting partition and cross-partition schemas.

FIG. 2 is a block diagram depicting partition and cross-partition schemas. A set of computing nodes may be configured to act as partitions 200, 202, and 204 of a distributed in-memory query processor (not shown). Each of partitions 200, 202, and 204 may be associated with a row segment 206, 208, and 210, respectively. Association with a row segment may include an affinity of a partition for hosting column segments whose values fall within a certain range. For example, partition 200 might be associated with row segment 206, which might correspond to rows 1-100 of a table. Similarly, partition 202 might be associated with row segment 208, corresponding to rows 101-200; and partition 204 might be associated with row segment 210, corresponding to rows 201-300.

Embodiments of a distributed in-memory query processor may utilize schema definitions pertaining to individual partitions. A partition schema 228 may comprise information indicative of columns whose corresponding segments have been downloaded into a memory of partition 200. In the example of FIG. 2, partition 200 may have loaded into its memory column segments 212, 218, and 224. A partition schema 228 may be indicative of the presence of these three columns. Embodiments may determine, in some cases, that a query may be resolved using rows within a range of rows contained in row segment 206, using the columns included in column segments 212, 218, and 224.

Embodiments of a distributed in-memory query processor may utilize schema definitions indicative of a schema that spans multiple partitions. For example, cross-partition schema 226 may comprise information indicative of columns whose corresponding segments have been downloaded into the memory of partitions associated with the cross-partition schema 226. A cross-partition schema 226 might also comprise, in various cases and embodiments, information indicative of columns whose corresponding segments have been or may be downloaded into the memory of partitions associated with the cross-partition schema 226. For example, column segments 212 and 218 might be present in the memory of partition 200, column segment 214 present in the memory of partition 202, and column segment 222 present in the memory of partition 204. In addition, column segment 220 might be scheduled for downloading into the memory of partition 202, and column segment 216 might be scheduled for downloading into the memory of partition 204.

Embodiments may process queries using partition schemas and cross-partition schemas having applicable columns and data ranges. In some cases and embodiments, partition schemas and cross-partition schemas may be selected for use based on the degree to which the schema conforms to a yet-to-be materialized schema containing the required data. For example, in FIG. 2 it might be presumed that column segments 212, 214, and 216 correspond to a column, which might be designated, for the purposes of this example, as column "A." Column segments 218, 220, and 222 might correspond to a column, which might be designated as column "B." It might further be presumed, also for the purposes of this example, that column segments 220 and 216 have not yet been downloaded. An embodiment might determine to process a query requiring columns "A" and "B" on a different set of partitions, if that set of partitions had a greater proportion of row segments already downloaded. This hypothetical set of partitions might, for example, contain column segments for columns "A" and "B," as well as an additional column "C" (not shown) within the applicable range of rows.

Figure 3:
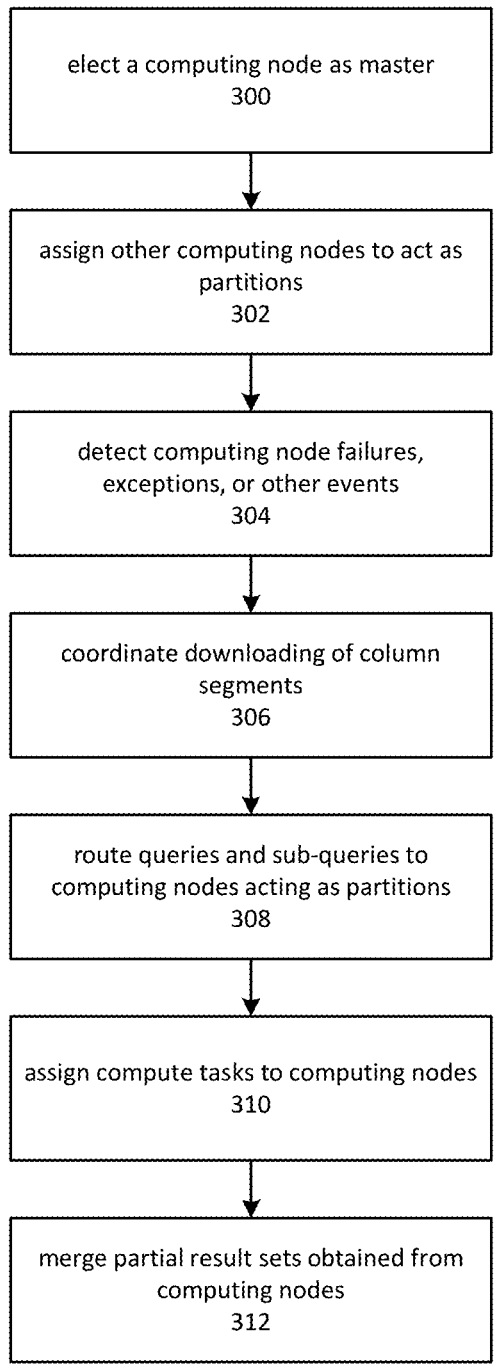
FIG. 3 is a flowchart depicting an embodiment of a process for utilizing a computing node elected as a master to process a query in a distributed, in-memory query processor that utilizes a remote data store.

FIG. 3 is a flowchart depicting an embodiment of a process for utilizing a computing node elected as a master to process a query in a distributed, in-memory query processor that utilizes a remote data store. Embodiments may perform some operations related to the distributed processing of a query using a computing node elected as a master. A master computing node may perform operations such as detecting computing node failures, routing queries or sub-queries to partitions, assigning partitions to perform compute tasks such as calculating aggregates, and merging partial results received from the partitions.

Although FIG. 3 is depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

As depicted by element 300, embodiments may elect a computing node to act as a master. Embodiments may, in some cases, elect a master from among a pool of computing nodes. Other computing nodes in the pool may be assigned to act as partitions, as depicted by element 302. In the event of failure, another computing node may be elected as master. Embodiments may select the computing node that is, at the time of election, least useful as a partition. The usefulness of a computing node as a partition may be determined based on factors such as the column segments downloaded to the memory of the computing node and the frequency with which the column segment is accessed.

As depicted by element 304, embodiments may monitor, through operations directed by the master, the other computing nodes to detect failures, exceptions, or other events affecting operation of the system. If a partition fails or otherwise ceases operation, a computing node elected as master may replace the first partition with a second partition. Embodiments may select the second partition based on the second partition having a partition-level schema that is close to, the same, or a superset of the partition-level schema of the first partition.

As depicted by element 306, embodiments may coordinate downloading of column segments to computing nodes elected as partitions. A computing node elected as master may maintain associations between partitions and row segments, so that a given computing node has an affinity for column segments that include data for a given row segment, or, in other words, for a given range of rows. More than one partition may have an affinity for the same row segment. A given partition may also have an affinity for more than one row segment.

As depicted by element 308, embodiments may route queries and sub-queries to computing nodes acting as partitions. A computing node elected as master may maintain or access a store of metadata indicating which partitions hold which column segments in memory, the ranges of data contained in the segments, partition-level schemas, cross-partition schemas, and so forth. Embodiments may keep track of download status information for the column segments, such as whether the column segment has already been downloaded, is currently downloading, or has not yet begun to be downloaded.

The store of metadata may be employed by the computing node elected as master to cause the partitions to execute queries and sub-queries. The partitions may be selected based on factors such as partition-level schema, cross-partition schemas, the latency or other performance impact of downloading column segments, utilization of the partition, and so on.

Embodiments may maintain metadata pertaining to the mutability of the column segments. A column segment may be considered immutable if the data contained within the segment is not subject to change, or is not subject to change during the time period in which the data is to be retained in a partition memory.

As depicted by element 310, embodiments may assign compute tasks to computing nodes. In various embodiments, a computing node elected as master may attempt to balance utilization of the computing nodes. For example, if two of three partitions are processing sub-queries, the master might select the third partition for computing a derived value or performing some intermediate stage of processing the query.

As depicted by element 312, embodiments may merge partial result sets received from the partitions or other computing nodes. A computing node elected as master may receive partial result sets from computing nodes involved in processing the query and assemble the partial results into a completed result set that may be transmitted to the requesting client.

Figure 4:
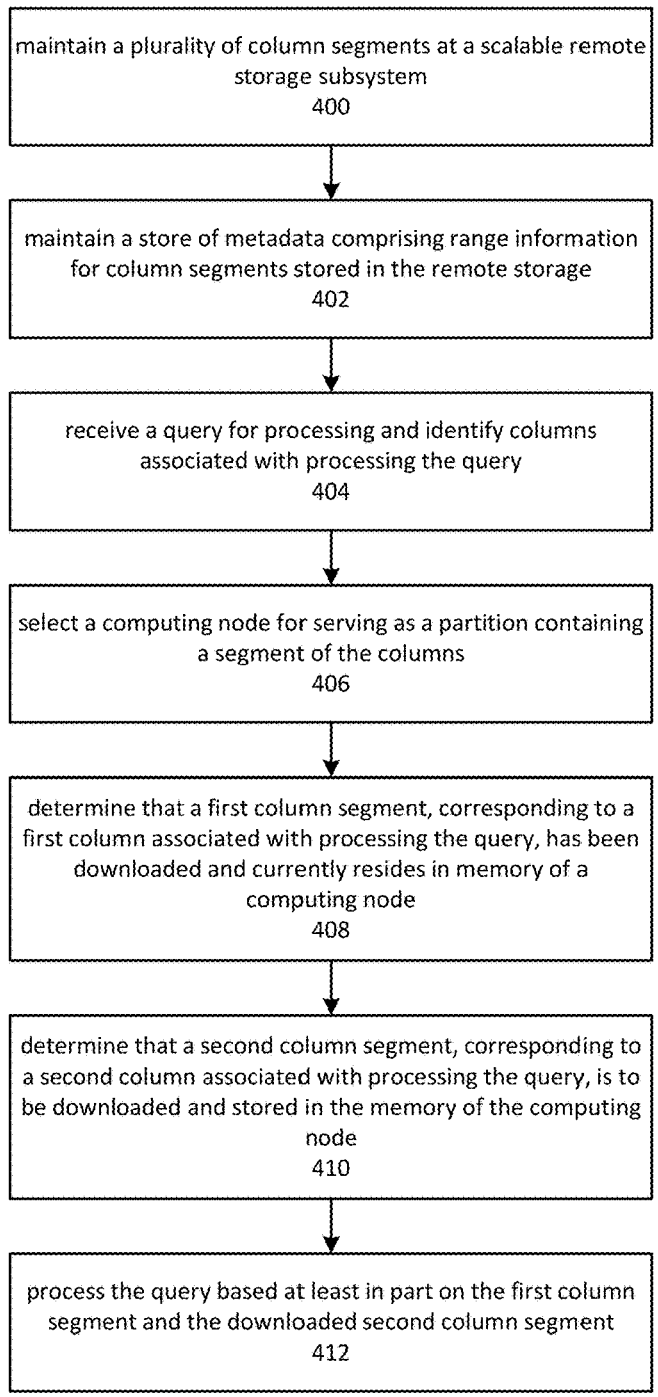
FIG. 4 depicts an embodiment of a process for performing a query that involves data maintained on a data store remote to a query processor, utilizing a scalable and distributed in-memory query processing system.

FIG. 4 depicts an embodiment of a process for performing a query that involves data maintained on a data store remote to a query processor, utilizing a scalable and distributed in-memory query processing system. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

As depicted by element 400, embodiments may maintain a plurality of column segments at a scalable remote storage system. A scalable remote storage system may be a system in which data can be accessed using a value such as a filename, an object identifier, a key, and so forth. These may be referred to as a key. The scalable remote storage system may be operated by the same entity as the query processor or by a different entity. The scalable remote storage system may be connected to the query processor by a network, such as the Internet.

Embodiments may utilize a naming pattern for the keys used to access column segments. Embodiments may, for example, utilize a hash of the contents of a column segment when assigning a name. Embodiments may utilize the hash as a means of identifying a particular version of a column segment. In various cases and embodiments, column segments may be immutable or effectively immutable. Use of a hash or other mechanism may help to avoid use of incorrect versions of a column segment, and may help to avoid accidental corruption of the column segment. Embodiments may recalculate the hash upon receipt of the column segment in order to detect a corrupted transmission of the column segment.

As depicted by element 402, embodiments may maintain a store of metadata comprising range information for column segments stored in the remote storage. The store of metadata may be distributed between various systems, such as the computing node elected as master, the computing nodes acting as partitions, the remote data store, and/or an additional key-value data store.

As depicted by element 404, embodiments may receive a query for processing and identify columns associated with processing the query. This may, for example, comprise identifying a first column and a second column associated with processing the query. The columns may be those referenced in the query, such as in a projection clause or a filter clause.

As depicted by element 406, embodiments may select a computing node for serving as a partition containing a segment of the columns. The selection may be based on the partition-level schemas and cross-partition schemas held by the local computing nodes, the utilization of the computing nodes, the latency involved in downloading additional segments, and so on.

As depicted by element 408, embodiments may determine that a first column segment, corresponding to a first column associated with processing the query, has been downloaded and currently resides in a memory of a local computing node. Embodiments may then, as depicted by element 410, determine that a second column segment, corresponding to a second column associated with processing the query, is to be downloaded and stored in the memory of the local computing node.

As depicted by element 412, embodiments may process the query based at least in part on the first column segment, previously downloaded to the local computing node, and the recently downloaded second column segment. This may comprise evaluating a portion of the query on the computing node. The query may be evaluated as if the computing node were an independent database maintaining a table whose schema comprises the first and second columns.

Aspects of the present disclosure may be practiced in various systems and methods, and may be incorporated onto non-transitory computer readable media and computer program products. In an embodiment, a system may comprise a plurality of computing nodes. The first computing node may comprise a first memory. The first memory may be a main system memory, and may include random access memory ("RAM"), dynamic random access memory ("DRAM"), low-latency storage, such as solid-state memories, and so on. The embodiment may further comprise one or more memories having stored thereon computer-readable instructions that, upon execution by a computing device, cause the system at least to maintain a store of metadata comprising information indicative of ranges of values of a plurality of column segments stored at the remote storage. The instructions, when executed, may cause the system to identify a first column and a second column associated with processing of a query. The instructions, when executed, may cause the system to determine that the first memory has stored thereon a first column segment of the plurality of column segments, the first column segment corresponding to the first column. The instructions, when executed, may cause the system to select the first computing node for processing the query based at least in part on the first memory having stored thereon the first column segment. The instructions, when executed, may cause the system to determine, based at least in part on the ranges of values, to download a second column segment of the plurality of column segments from the remote storage to the first memory, wherein the second column segment corresponds to the second column and is row-aligned with the first segment. The instructions, when executed, may cause the system to process the query based at least in part on accessing the first and second column segments in the first memory.

In an embodiment, a non-transitory computer-readable medium or computer program product may, when executed by a computing device, cause the computing device to maintain a store of metadata indicative of a plurality of column segments stored at a remote storage. The instructions, when executed by the computing device, may further cause the computing device to determine that a first memory of a first computing node comprises a first column segment of the plurality of column segments, the first column segment corresponding to a first column associated with processing of a query. The instructions, when executed by the computing device, may further cause the computing device to select the first computing node for processing the query based at least in part on the first memory having stored thereon the first column segment. The instructions, when executed by the computing device, may further cause the computing device to determine, based at least in part on the store of metadata, to cause a second column segment of the plurality of column segments to be downloaded from the remote storage to the first memory, wherein the second column segment is row-aligned with the first segment and corresponds to a second column associated with the processing of the query. The instructions, when executed by the computing device, may further cause the computing device to process the query based at least in part on accessing the first and second column segments in the first memory.

In an embodiment, a computer-implemented method may comprise maintaining a store of metadata indicative of a plurality of column segments stored at the data store. The computer-implemented method may further comprise determining that a first memory of a first computing node comprises a first column segment of the plurality of column segments, the first column segment corresponding to a first column associated with processing of a query. The computer-implemented method may further comprise causing the computing device to select the first computing node for processing the query based at least in part on the first memory having stored thereon the first column segment. The computer-implemented method may further comprise determining, based at least in part on the store of metadata, to cause a second column segment of the plurality of column segments to be downloaded from the data store to the first memory, wherein the second column segment is row-aligned with the first segment and corresponds to a second column associated with the processing of the query. The computer-implemented method may further comprise processing the query based at least in part on accessing the first and second column segments in the first memory.

In a further aspect of the above embodiments, a system, method, computer-readable medium, or computer program product may comprise determining to download a first additional column segment of the plurality of column segments to a second memory, the additional segment corresponding to the first column; and determining, based at least in part on the metadata store, that a second additional column segment of the plurality of column segments is not required to process the query, wherein the second additional column segment is row-aligned with the first additional column segment.

In a further aspect of the above embodiments, a system, method, computer-readable medium, or computer program product may comprise determining that the first and second column segments comprise values sufficient to complete processing of the query.

In a further aspect of the above embodiments, a system, method, computer-readable medium, or computer program product may comprise a store of metadata that is maintained by an additional computing node elected as a master.

In a further aspect of the above embodiments, a system, method, computer-readable medium, or computer program product may comprise maintaining, in an additional memory of an additional computing node elected as a master, an indication of an affinity between the first computing node and column segments that are row-aligned with the first column segment.

In a further aspect of the above embodiments, a system, method, computer-readable medium, or computer program product may comprise the first memory being a random access memory.

In a further aspect of the above embodiments, a system, method, computer-readable medium, or computer program product may comprise maintaining a first schema in the first memory of the first computing node, wherein the first schema is representative of a table comprising the first column; and maintaining an additional schema on an additional memory of an additional computing node, wherein the additional schema is representative of a table comprising the first column and the second column.

In a further aspect of the above embodiments, a system, method, computer-readable medium, or computer program product may comprise a column segment of the plurality of column segments that is sized to fit within the first memory.

In a further aspect of the above embodiments, a system, method, computer-readable medium, or computer program product may involve selecting a second computing node, of the plurality of computing nodes, for processing a second at least a subset of the query. The aspect may further involve forming a result of processing the query by assembling, at a computing node elected as master, results of processing the at least a subset of the query at the first computing node and the second at least a subset of the query at the second computing node.

In a further aspect of the above embodiments, a system, method, computer-readable medium, or computer program product may involve maintaining the store of metadata in a key-value repository.

In a further aspect of the above embodiments, a system, method, computer-readable medium, or computer program product may involve operating a plurality of computing nodes for processing the query, the plurality of computing nodes comprising the first computing node, wherein computing nodes are included in the plurality of computing nodes to have capacity sufficient for computational demands associated with processing the query, independently of storage capacity of the data store.

Each of the above aspects may be combined with or omitted from various embodiments of the present disclosure.

Figure 5:
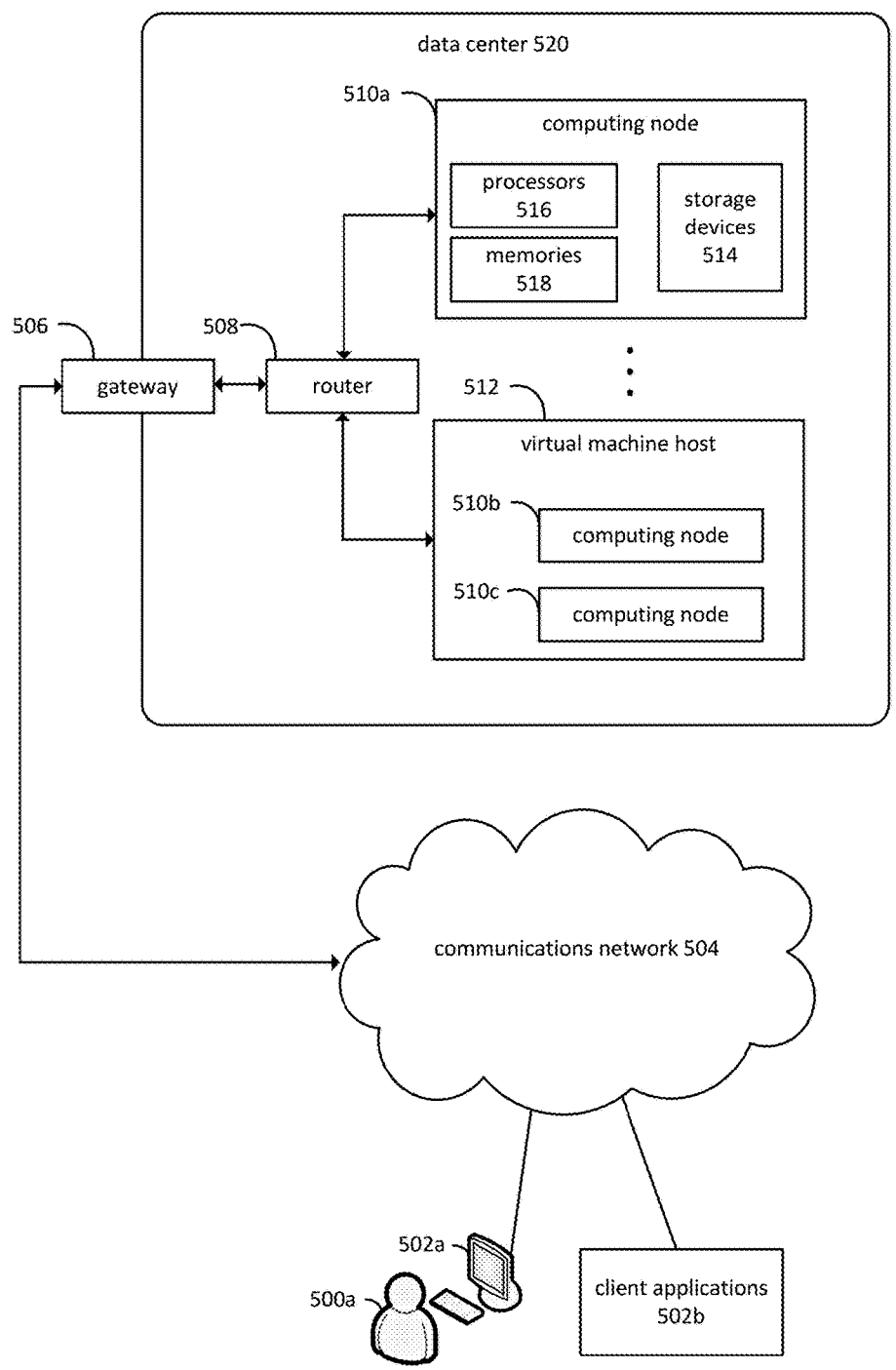
FIG. 5 is a block diagram depicting an embodiment of a computing environment in which aspects of the present disclosure may be practiced.

FIG. 5 is a diagram depicting an example of a distributed computing environment on which aspects of the present invention may be practiced. Various users 500*a* may interact with various client applications, operating on any type of computing device 502*a*, to communicate over communications network 504 with processes executing on various computing nodes 510*a*, 510*b*, and 510*c* within a data center 520. Alternatively, client applications 502*b* may communicate without user intervention. Communications network 504 may comprise any combination of communications technology, including the Internet, wired and wireless local area networks, fiber optic networks, satellite communications, and so forth. Any number of networking protocols may be employed.

Communication with processes executing on the computing nodes 510a, 510b, and 510c, operating within data center 520, may be provided via gateway 506 and router 508. Numerous other network configurations may also be employed. Although not explicitly depicted in FIG. 5, various authentication mechanisms, web service layers, business objects, or other intermediate layers may be provided to mediate communication with the processes executing on computing nodes 510a, 510b, and 510c. Some of these intermediate layers may themselves comprise processes executing on one or more of the computing nodes. Computing nodes 510a, 510b, and 510c, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510a is depicted as residing on physical hardware comprising one or more processors 516, one or more memories 518, and one or more storage devices 514. Processes on computing node 510a may execute in conjunction with an operating system or alternatively may execute as a bare-metal process that directly interacts with physical resources, such as processors 516, memories 518, or storage devices 514.

Computing nodes 510b and 510c are depicted as operating on virtual machine host 512, which may provide shared access to various physical resources, such as physical processors, memory, and storage devices. Any number of virtualization mechanisms might be employed to host the computing nodes.

The various computing nodes depicted in FIG. 5 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 6:
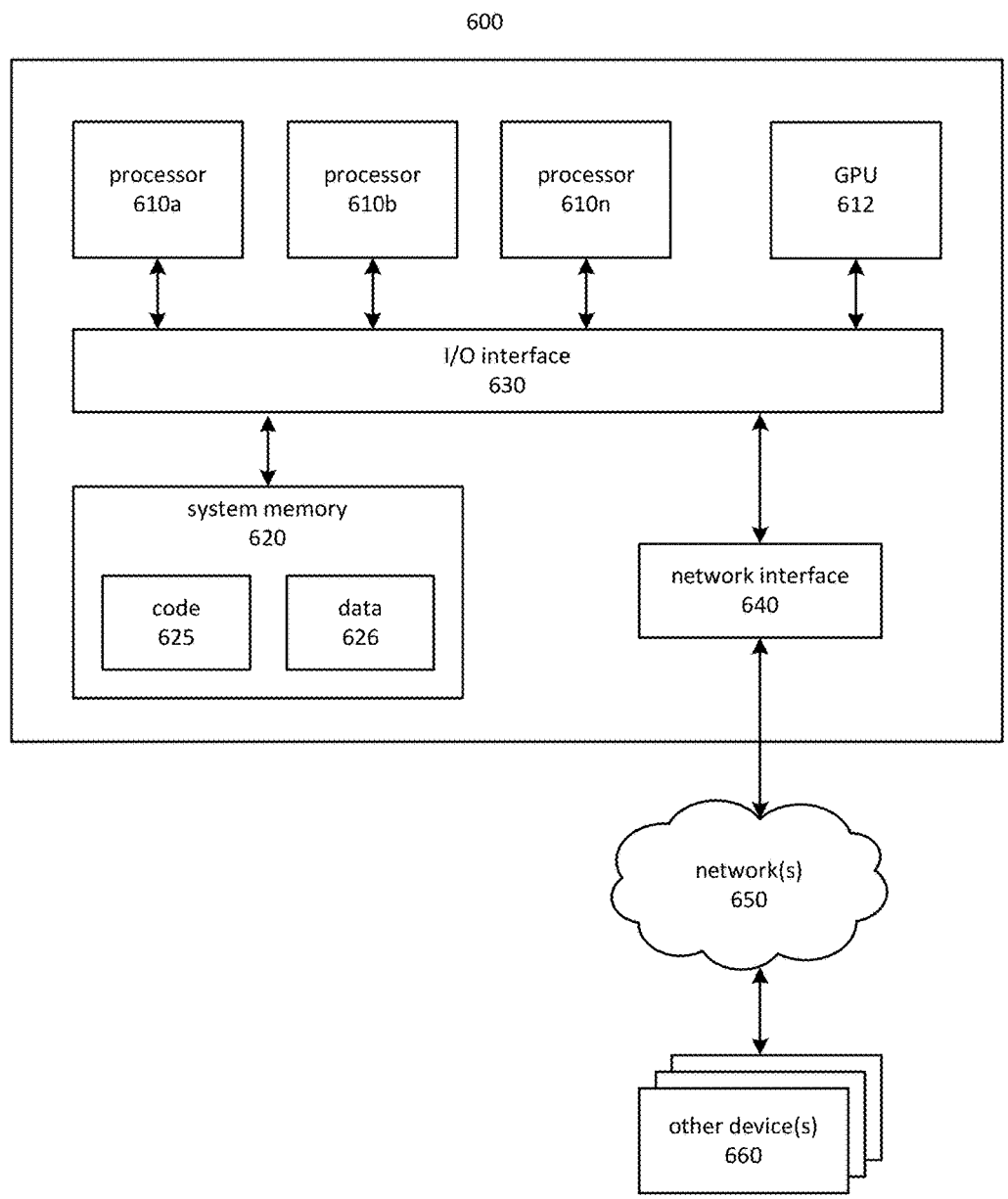
FIG. 6 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610a, 610b, and/or 610n (which may be referred herein singularly as a processor 610 or in the plural as the processors 610) coupled to a system memory 620 via an input/output ("I/O") interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures ("ISAs"), such as the x86, PowerPC, SPARC or MIPS ISAs, or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect ("PCI") bus standard or the Universal Serial Bus ("USB") standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone.

Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A data warehouse system utilizing a remote storage service and locally processing queries, the system comprising:
 a plurality of computing nodes including a first computing node and a second computing node, the first computing node comprising a first memory; and
 one or more memories having stored thereon computer-readable instructions that, upon execution by a computing device, cause the system at least to:
  maintain metadata comprising information indicative of a plurality of column segments stored at the remote storage service, the metadata comprising information indicative of a range of values stored in a column segment of the plurality of column segments;
  identify, based at least in part on the metadata, a first column segment and a second column segment, of the plurality of column segments, associated with processing a query, the first column segment a subset of a first column and the second column segment a subset of a second column;

select the first computing node for processing at least a subset of the query based at least in part on a determination that the first memory has stored thereon the first column segment;
determine, based at least in part on the metadata indicative of the range of values, to download the second column segment from the remote storage service to the first memory, wherein the second column segment corresponds to the second column and is row-aligned with the first segment;
select the second computing node for processing a second at least a subset of the query; and
process the query based at least in part on accessing the first and second column segments in the first memory, where results of processing the query are formed at a computing node elected as master by assembling results of processing the at least a subset of the query at the first computing node and the second at least a subset of the query at the second computing node.

2. The system of claim 1, further comprising one or more memories having stored thereon computer-readable instructions that, upon execution by the computing device, cause the system at least to:
determine to download a first additional column segment of the plurality of column segments to a second memory, the additional segment corresponding to the first column; and
determine, based at least in part on the range of values, that a second additional column segment of the plurality of column segments is not required to process the query, wherein the second additional column segment is row-aligned with the first additional column segment.

3. The system of claim 1, further comprising one or more memories having stored thereon computer-readable instructions that, upon execution by the computing device, cause the system at least to:
determine that the first and second column segments comprise values sufficient to complete processing of the query.

4. The system of claim 1, further comprising one or more memories having stored thereon computer-readable instructions that, upon execution by the computing device, cause the system at least to:
maintain, in an additional memory of an additional computing node elected as master, an indication of an affinity between the first computing node and column segments that are row-aligned with the first column segment.

5. A non-transitory computer-readable storage medium having stored thereon instructions that, upon execution by one or more computing devices, cause the one or more computing devices at least to:
maintain metadata indicative of a plurality of column segments stored at a remote storage, the metadata comprising information indicative of a range of values stored in each column segment;
determine that a first memory of a first computing node has stored thereon a first column segment of the plurality of column segments, the first column segment corresponding to a first column associated with processing of a query;
select the first computing node for processing at least a subset of the query based at least in part on the first memory having stored thereon the first column segment;
determine, based at least in part on the metadata, to cause a second column segment of the plurality of column segments to be downloaded from the remote storage to the first memory, wherein the second column segment is row-aligned with the first segment and corresponds to a second column associated with the processing of the query;
select a second computing node for processing a second at least a subset of the query; and
process the query based at least in part on accessing the first and second column segments in the first memory, wherein results of the query are formed, at a computing node elected as master, by assembling results from the first computing node and results from the second computing node.

6. The non-transitory computer-readable storage medium of claim 5, comprising further instructions that, upon execution by the one or more computing devices, cause the one or more computing devices to at least:
determine to download a first additional column segment of the plurality of column segments to a second memory, the additional segment corresponding to the first column; and
determine, based at least in part on the metadata, that a second additional column segment of the plurality of column segments is not required to process the query, wherein the second additional column segment is row-aligned with the first additional column segment.

7. The non-transitory computer-readable storage medium of claim 5, comprising further instructions that, upon execution by the one or more computing devices, cause the one or more computing devices to at least:
determine that the first and second column segments comprise values sufficient to complete processing of the query.

8. The non-transitory computer-readable storage medium of claim 5, comprising further instructions that, upon execution by the one or more computing devices, cause the one or more computing devices to at least:
maintain the metadata in a key-value repository.

9. The non-transitory computer-readable storage medium of claim 5, comprising further instructions that, upon execution by the one or more computing devices, cause the one or more computing devices to at least:
maintain, in an additional memory of an additional computing node elected as a master, an indication of an affinity between the first computing node and column segments that are row-aligned with the first column segment.

10. The non-transitory computer-readable storage medium of claim 5, wherein the first memory is random access memory.

11. The non-transitory computer-readable storage medium of claim 5, comprising further instructions that, upon execution by the one or more computing devices, cause the one or more computing devices to at least:
maintain a first schema in the first memory of the first computing node, wherein the first schema is representative of a table comprising the first column; and
maintain an additional schema on an additional memory of an additional computing node, wherein the additional schema is representative of a table comprising the first column and the second column.

12. The non-transitory computer-readable storage medium of claim 5, wherein a column segment of the plurality of column segments is sized to fit within the first memory.

13. A computer-implemented method of performing a query involving data maintained on a data store remote to a query processor, the method comprising:
   maintaining metadata indicative of a plurality of column segments stored at the data store,
   the metadata comprising information indicative of a range of values stored in each column segment;
   determining that a first memory of a first computing node has stored thereon a first column segment of the plurality of column segments,
   the first column segment is a subset of a first column associated with processing of a query;
   selecting the first computing node for processing at least a subset of the query based at least in part on the first memory having stored thereon the first column segment;
   determining, based at least in part on the metadata, to cause a second column segment of the plurality of column segments to be downloaded from the data store to the first memory,
   wherein the second column segment is row-aligned with the first segment is a subset of a second column associated with the processing of the query;
   processing the query based at least in part on accessing the first and second column segments in the first memory;
   selecting a second computing node to process a second at least a subset of the query; and
   generating results for the query by assembling, at one of the plurality of computing nodes, results from the first computing node and results from the second computing node.

14. The method of claim 13, further comprising:
   determining to download a first additional column segment of the plurality of column segments to a second memory, the additional segment corresponding to the first column; and
   determining, based at least in part on the metadata, that a second additional column segment of the plurality of column segments is not required to process the query, wherein the second additional column segment is row-aligned with the first additional column segment.

15. The method of claim 13, further comprising:
   determining that the first and second column segments comprise values sufficient to complete processing of the query.

16. The method of claim 13, further comprising:
   storing, in an additional memory of an additional computing node elected as a master, an indication of an affinity between the first computing node and column segments that are row-aligned with the first column segment.

17. The method of claim 13, further comprising:
   storing a first schema in the first memory of the first computing node, wherein the first schema is representative of a table comprising the first column; and
   storing an additional schema on an additional memory of an additional computing node, wherein the additional schema is representative of a table comprising the first column and the second column.

18. The method of claim 13, wherein a column segment of the plurality of column segments is sized to fit within the first memory.

19. The method of claim 13, wherein the data store comprises a distributed file store.

20. The method of claim 13, further comprising:
   operating a plurality of computing nodes for processing the query, the plurality of computing nodes comprising the first computing node, wherein computing nodes are included in the plurality of computing nodes to have capacity sufficient for computational demands associated with processing the query, independently of storage capacity of the data store.

* * * * *